Sept. 3, 1940.  F. A. DURAND  2,213,489
BRUSH
Filed May 4, 1938
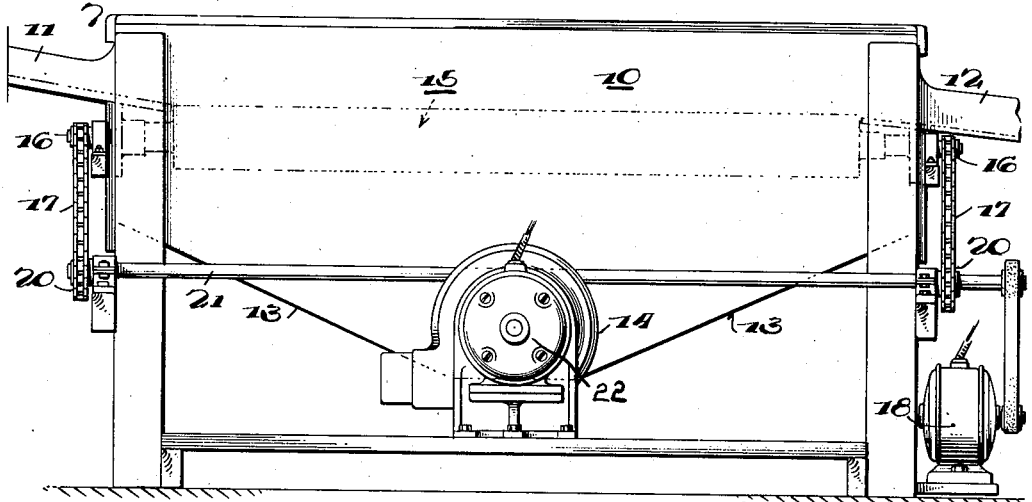
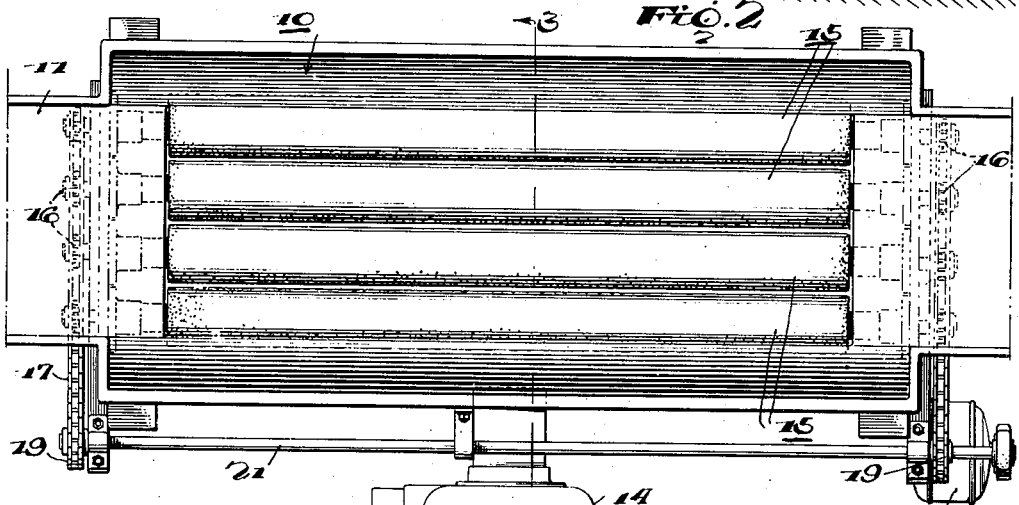
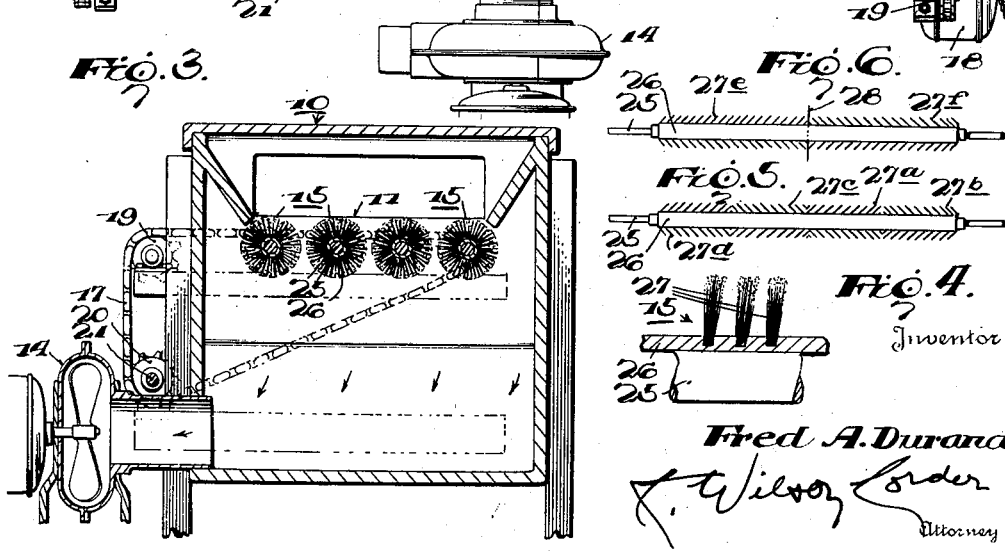
Inventor
Fred A. Durand
Attorney Patented Sept. 3, 1940

2,213,489

UNITED STATES PATENT OFFICE 2,213,489

BRUSH

Fred A. Durand, Woodbury, Ga.

Application May 4, 1938, Serial No. 205,916

1 Claim. (Cl. 146—202)

This invention relates to cleaning devices, and more particularly to a new and improved brush for machines used in the cleaning and polishing of fruits, vegetables and the like.

It is now generally customary for growers to subject fruits to a cleaning operation before packing and shipping, the purposes of such being to free the fruit from any dirt or other foreign matter that may have become attached thereto; to remove traces of poison that may remain on fruit that has been sprayed while in the orchard; to remove fur from peaches and thus impart a better appearance thereto and hence bring a higher price upon the market; and to polish certain fruits such as apples, with the foregoing considerations in mind.

Conventional fruit cleaning devices usually consist of one or more rotary brushes which are mounted either transversely of a supporting framework, or longitudinally thereof, the fruit being passed over or along such brushes and by being turned in relation thereto receiving a cleansing and polishing. An example of transversely disposed brushes will be found in my Patent No. 2,033,912, Brushing machines, dated March 17, 1936; and of longitudinally operating brushes in the patent to Stebler, No. 1,684,896, dated September 18, 1928, it being noted that in the latter device it is necessary to provide the brushes with spiral grooves in order that the fruit may be carried thereby through the machine.

Machines of the longitudinal brush type are objectionable in that only the spiral grooves on the brushes convey the fruit through the machine, and since such grooves constitute a relatively small portion of the entire brushing surface, the action of the device is slow and the capacity of the machine accordingly low.

An objection to machines of the transverse brush type lies in the fact that with use, these devices may tend to discharge the fruit from one side or the other, with resultant clogging, lowering the efficiency of the entire handling process, and injuring the fruit. Again, such devices, requiring as they do at least eighteen brushes, may be considered relatively expensive.

An object of this invention is to provide a cleaning and polishing brush that will automatically propel fruit or other articles in a direction parallel to the longitudinal axis of said brush as the brush is rotated.

Another object is to provide a brush for fruit cleaning machines which will prevent the fruit from being discharged from one side or the other of said machine.

A still further object is to provide a fruit cleaning brush that will tend to prevent the fruit from revolving continually on any given diameter during its passage through the machine, thus insuring that the ends of the article as well as its sides will be cleaned.

Another object is to provide a brush that will propel fruit more uniformly from one end to the other than is possible with conventional grooved brushes.

Another object is to provide a cleaning brush that tends to space fruit in its travel through a machine so as to insure a uniform discharge thereof at the discharge end of said machine.

Another object is to provide a brush which guarantees a greater travel of fruit during its progress through a given machine, thereby securing greater contact of the fruit with the brushes than has heretofore been possible, and thus securing more cleaning action to a given set of brushes.

Another object is to provide means for accomplishing the foregoing in a simple, positive, economical, and practicable manner.

These and other objects made apparent throughout the further progress of this specification are accomplished by means of my invention, the full and complete understanding of which is facilitated by reference to the drawing herein, in which:

Fig. 1 is a side view of a brushing machine embodying my invention.

Fig. 2 is a top view of the structure shown in Fig. 1.

Fig. 3 is a vertical sectional view of the machine illustrated in Fig. 2, said view being taken along the line 3—3 of Fig. 2.

Fig. 4 is a fragmentary view illustrating in detail the manner in which the bristles of my cleaning brushes are slanted.

Fig. 5 is a reduced side view of a cleaning brush involving a modification of the instant invention, this brush being adapted for use in a transverse machine.

Fig. 6 is a view similar to Fig. 5, illustrating another modification of the present invention.

Like numerals indicate corresponding parts throughout the various figures of the drawing.

Referring now to the drawing (Fig. 1) it will be seen that my invention comprises a brushing machine consisting of a supporting frame 10 at one end of which is an inclined feeding chute 11, and at the other end an inclined discharge chute 12. The bottom of the framework is preferably sealed by sloping surfaces 13, and a power driven exhaust fan 14 is so connected with this compartment as to draw down dirt or fuzz removed from articles above, and blow such out of the building.

Disposed longitudinally of supporting frame 10, and in operative relation to chutes 11 and 12, are a series of brushes 15, said brushes being journalled in bearings at opposite ends of the frame to rotate freely. On the ends of each brush are placed sprockets 16, upon which operate chains 17, which chains are driven by a motor 18. Idler sprockets 19 (Fig. 3) may be mounted at either end of the device, and driving sprockets 20 connected by a shaft 21 serve to rotate brushes 15 when energy is directed to said shaft. Or if desired the mechanism may be simplified as by placing driving sprockets on only one end of each brush, using a single chain and omitting idler sprockets. Exhaust 14 may be actuated independently as by a motor 22, or driven through conventional connections with shaft 21.

It will be noted that discharge chute 12 is preferably disposed slightly below the tops of brushes 15, this because fruit naturally gets down into the grooves, as will be described more in detail hereafter, and it is desirable that there be a continuous and uninterrupted flow of fruit from the machine without piling up at the discharge end, as might occur if a step-up or ledge had to be overcome at that point.

Special attention is now directed to brushes 15 which, it will be noted, are level from end to end, all rotate in the same direction, and are mounted in slightly spaced relationship on the same horizontal plane, said spacing providing a groove between brushes deep enough to prevent transverse movement of the articles being cleaned, from one path to the next. Brushes 15 consist of shafts 25, which carry a core 26 to which are attached bristles 27, said brushes being conventional in every respect except that the bristles are so set as to slant or point towards one end of the brush. That is, said bristles are uniformly mounted at an angle less than ninety degrees to the horizontal plane of said brush, the resulting structure being a cleaning element having a series of bristles pointing longitudinally towards the end thereof.

For illustrative purposes in the drawing (Fig. 4) this slant is shown as 5° from the perpendicular, said result being achieved by drilling the holes in the brush core at an angle of about 85° to the brush axis. A similar result may be achieved by driving the double pointed staples, which hold the hair in the holes, in the wooden brush core or block when such holes are drilled at a 90° angle, so that the line passing through the two points of the staple is at an angle less than 90° to the central axis of the core, the bristles then assuming in use a slanting position. If the staples are driven either exactly parallel or at right angles to the central axis, the bristles will stay erect permanently.

The angle at which the bristles of a brush embodying my invention should be set may be made to vary according to the type of brush employed, the type of machine, the principal use for which it is intended, et cetera, it being apparent that the smaller the angle the bristle makes with its supporting structure, the faster it will impel articles from one of its ends to the other, this being true up to the point where the angle becomes so small that the bristles lose their impelling action.

Extensive experimentation has shown that fruit, coming into contact with such a brush while the same is being rotated, is automatically, quickly, and positively carried in the direction towards which the bristles point, said bristles tending to bend uniformly in such direction under the weight of the fruit and act as impellers to urge said fruit longitudinally of the brush. This action, coupled with the normal rotary movement of the brush, serves not only to revolve the fruit along its minimum diameter as in the case of an ordinary brush, but also tends to turn the fruit end for end, which movement insures that the ends as well as the sides of the article will be cleaned.

In a brushing machine in which the brushes are disposed longitudinally of the supporting framework, a brush of this type is particularly desirable, since it carries the fruit through the machine without the employment of the usual spiral grooves now used in such devices, said grooves being objectionable in that since they afford the only means of impelling the fruit (it being obvious that fruit disposed upon an ordinary rotating brush will find no incentive to travel from one end thereof to the other), the passage of said fruit will necessarily be slow, whereas in the case of the instant brush the entire surface thereof furnishes a continuous and uniform propelling surface which acts to drive the fruit through in a uniform and positive manner.

It will be understood that the term "bristle" as used throughout this specification and the appended claim, includes not only hogs' bristles, but also any brush filling material, such as horsehair or vegetable fiber for example, suitable for the intended purpose.

A modification of my brush primarily for use in a transverse machine is illustrated in Fig. 5, said modification, comprising a brush having alternate sections of bristles slanted towards each other. For instance, bristles 27a slant towards bristles 27b, and vice versa, while bristles 27c and 27d form a like section of brush, such an arrangement being continued along the entire length of the brush, the end segment of bristles in each case preferably pointly inwardly. This structure insures a more uniform distribution of the fruit throughout the bushing surfaces of the machine which in turn means that the said fruit will be discharged evenly at the end thereof and at the same time kept away from the sides of the machine.

A second modification of my brush is illustrated in Fig. 6, in which half of the bristles point one way and half the other. That is, bristles 27e, or all those bristles to the left of the center 28 of the brush, are slanted towards said center, while all bristles to the right of the center, said bristles being designated 27f, slant in an opposite direction to 27e, or towards said center. When a brush of this type is employed in a machine in which the brushes are disposed transversely of the frame, said bristles urge the fruit towards the center of the machine and away from the sides thereof. This action positively prevents the machine from discharging to one side or the other as do many machines after they have been used a short while, with the bad results mentioned previously herein. Further, the fruit is kept away from the side walls of the machine during its passage therethrough, thus precluding injury to thin-skinned fruit from contact with said walls, as otherwise frequently occurs.

Various combinations of the brushes disclosed herein suggest themselves to those skilled in the art. For instance, in a transverse machine, a brush such as that illustrated in Fig. 4 may be employed, every other brush, however, having its bristles slant in the opposite direction to those of the brush just behind it in the series, in order that the fruit may take the longest possible course in its travel through the machine, with attendant economy in the result achieved with a given number of brushes. Or in a longitudinal machine a second series of longitudinal rolls may be positioned in spaced relationship above the first set, said upper set having bristles that slant in the opposite direction to those of the lower, and possibly being driven at a different rate of speed, a brushing machine that will do a very thorough job being thereby created, it being apparent that the retarding effect of the upper brushes tends to keep the fruit in the machine much longer than it would ordinarily be so kept in a machine in which all impellers work in one direction.

The operation of my device is readily apparent from the foregoing description, fruit, such as peaches for example, being fed to the machine through inclined chute 11 and traveling at a uniform slow speed to the other end where it is discharged to chute 12. Brushes 15, which may be of comparatively large diameter, are rotated in the manner indicated, the fruit moving in the grooves formed between each pair of brushes and being propelled forwardly by the slanting bristles thereof. The spacing and size of the brushes prevents transverse movement of the fruit in the machine from one path to the other, the fruit remaining on the brushes long enough to have all fuzz or foreign matter removed therefrom.

From the foregoing it is apparent that I have described a new and useful brush for fruit cleaning machine. That said brush, by automatically impelling articles from one of its ends to the other, provides a more rapid and more positive longitudinal impelling means for machines in which the brushes are disposed lengthwise instead of at right angles to the supporting framework; eliminates the discharge of fruit from transverse brushing machines at the side; and makes possible a more thorough brushing action per given series of brushes. That my brush is simple, economical and practicable, and highly efficient for the purposes intended.

It is apparent that certain changes, additions alterations, and reconstructions of the instant device may be resorted to without departing from the scope of the appended claim which is to be accorded a liberal construction in keeping with my contribution to the art.

I claim:

A fruit cleaning machine comprising a supporting framework, a plurality of more than two substantially cylindrical cleaning brushes of substantially uniform diameter, means rotatably mounting said brushes in side by side spaced relationship in said framework on a substantially horizontal plane, means to feed fruit to the upper surfaces of the brushes and means to discharge it therefrom, the majority of the bristles of each brush substantially throughout the length of the brush being mounted at an angle of less than ninety degrees to the center axis of the brush and so inclined toward one end thereof as to feed and modify the axis of rotation of the fruit during the brushing operation, and means for rotating the brushes all in the same direction of rotation.

FRED A. DURAND.